(12) United States Patent
Röthig

(10) Patent No.: US 6,863,706 B2
(45) Date of Patent: Mar. 8, 2005

(54) MODULE FOR USE AS A FILTER, CATALYTIC CONVERTER, OR HEATER, AND METHOD FOR THE MANUFACTURE THEREOF

(75) Inventor: Thomas Röthig, Schwelm (DE)

(73) Assignee: GKN Sinter Metals GmbH (DE)

( * ) Notice: Subject to any disclaimer, the term of this patent is extended or adjusted under 35 U.S.C. 154(b) by 81 days.

(21) Appl. No.: 10/371,739

(22) Filed: Feb. 21, 2003

(65) Prior Publication Data

US 2003/0154700 A1 Aug. 21, 2003

Related U.S. Application Data

(63) Continuation of application No. PCT/EP01/08307, filed on Jul. 18, 2001.

(30) Foreign Application Priority Data

Aug. 26, 2000 (DE) .......................................... 100 41 992

(51) Int. Cl.[7] .......................... B01D 39/20; B01D 29/11
(52) U.S. Cl. .............................. 55/523; 55/482; 55/484; 55/486; 55/492; 55/501; 55/502; 55/529; 55/DIG. 5; 428/550; 502/439; 29/896.62; 29/428; 29/902
(58) Field of Search ........................ 55/482, 484, 486, 55/487, 492, 501, 502, 520, 523, 529, DIG. 5, 361, 378, 379, 381, 382, DIG. 2; 210/496, 497.1, 510.1; 428/550; 228/196; 502/439; 29/890, 890.03, 428, 527.1, 902, 896.62

(56) References Cited

U.S. PATENT DOCUMENTS

| 4,186,100 | A | | 1/1980 | Mott | 210/496 |
| 4,270,936 | A | * | 6/1981 | Mann | 55/523 |
| 4,968,424 | A | * | 11/1990 | Plaisier | 55/492 |
| 5,100,551 | A | * | 3/1992 | Pall et al. | 55/523 |
| 5,114,447 | A | * | 5/1992 | Davis | 55/523 |
| 5,405,423 | A | * | 4/1995 | Haerle | 55/523 |
| 5,456,069 | A | * | 10/1995 | Haerle | 55/523 |
| 6,451,081 | B1 | * | 9/2002 | Alvin | 55/523 |
| 6,612,481 | B2 | * | 9/2003 | Bode | 228/143 |
| 2003/0000890 | A1 | * | 1/2003 | Quick et al. | 228/196 |

FOREIGN PATENT DOCUMENTS

| DE | 89 10 190 | | 11/1989 | |
| DE | 197 58 454 A1 | | 10/1998 | |
| EP | 0 819 459 A1 | | 1/1998 | |
| GB | 901 261 | | 7/1962 | |
| JP | 7-24227 | * | 1/1995 | B01D/39/12 |

* cited by examiner

Primary Examiner—Duane Smith
Assistant Examiner—Jason M. Greene
(74) Attorney, Agent, or Firm—Woodcock Washburn LLP

(57) ABSTRACT

In order to achieve the object of providing a module having improved mechanical characteristics as well as a wide range of application, it is proposed that the module include at least one layer having open porosity, having an outer side facing a medium flowing into the module and an inner side facing away from the inflowing medium, manufactured from a material that can be sintered, selected from a group including metals, metal oxides, metal compounds, and/or metal alloys.

27 Claims, 2 Drawing Sheets

MODULE FOR USE AS A FILTER, CATALYTIC CONVERTER, OR HEATER, AND METHOD FOR THE MANUFACTURE THEREOF

This is a continuation of PCT/EP01/08307, filed Jul. 18, 2001, which claims priority to German Application No. 100 41 992.5 filed Aug. 26, 2000.

BACKGROUND OF THE INVENTION

The present invention relates to a module for use as a filter, catalytic converter, or heater, comprising at least one layer having open porosity, as well as a method for manufacturing such a module, and the use thereof In the sense of the present invention, "modules" are understood to be exchangeable parts, having relatively complex construction, of a larger unit, which in themselves form a closed functional unit. Examples of such modules include modules known from filter technology, such as spiral modules, tube modules, hollow-fiber modules, or flat or cushion modules.

Filters, catalytic converters, and heaters are standardly used in the form of filter cartridges, plates, papers, or the like. A disadvantage of these is in particular that these have over a relatively small filter surface in the predetermined volume. For this reason, in particular in membrane technology modules have been developed that make it possible to house a large surface in a small space. Typical examples of such modules include spiral modules and tube modules. These are manufactured from polymer or ceramic materials (tube modules). However, such modules have the great disadvantage that the membranes used in them must be sealed or glued either to one another or to a housing. For this reason, such modules often have only a relatively narrow range of application with respect to the temperatures that can be used, the environment in which they are used, in particular with respect to chemical and/or corrosive substances that are present, and with respect to their mechanical strengths, in particular relating to trans-membrane pressure and loss of pressure from overflow.

The object of the present invention is to provide modules that do not have the disadvantages cited above.

According to the present invention, this object is achieved through a module for use as a filter, catalytic converter, or heater, comprising at least one layer having open porosity, having an outer side facing a medium flowing into the module and an inner side facing away from the medium flowing in, and manufactured from a material that can be sintered and that is selected from a group comprising metals, metal oxide, metal compounds, and/or metal alloys, the layer being fashioned in the form of a pocket and the longitudinal sides of the layer formed as a pocket being sealed through sintering, and in which in addition the layers or regions of a layer are held to one another through sintering.

Materials that can be sintered include in particular powders or mixtures of powders, for example of steels such as chromium-nickel steel, bronzes, nickel-based alloys such as Hastalloy, Inconel, metal oxides, metal nitrides, metal silicides, or the like; here the powder mixtures can also contain high-melting components such as for example platinum or the like. The powder used, and its particle size, depends on the intended use. Preferred powders include the alloys 316 L, 304 L, Inconel 600, Inconel 625, Monel, and Hastalloy B, X, and C. In addition, the sinterable material can be made completely or partially of short fibers or fibers, preferably fibers having diameters between approximately 0.1 and 250 $\mu$m, and a length from a few $\mu$m up to the millimeter range, up to about 50 mm, such as for example metal fiber fleece.

The layer can be a green product, manufactured by thin-film casting, spraying, or immersion of a suspension of the sinterable material in an organic solvent such as isopropanol or ethanol, with the addition of a binding agent if necessary. Other organic solvents that can be used The layer can be a green product, manufactured by thin-film casting, spraying, or immersion of a suspension of the sinterable material in an organic solvent such as isopropanol or ethanol, with the addition of a binding agent if necessary. Other organic solvents that can be used include methanol, toluol, trichlorethylene, diethylether, and low-molecular aldehydes and ketones that can vaporize at temperatures less than 100 EC. As a binding agent, waxes or shellac can be used, but also in particular polymer compounds can be used; here polyalkalene oxides or polyglycols, in particular polyethylene glycols, can preferably be used. Polyalkalene oxides and glycols are preferably used as polymers and/or copolymers having medium molecular weights, in a range from 100 to 500,000 g/mol, preferably 1,000 to 350,000 g/mol, or more preferably 5,000 to 6,5000 [sic] g/mol, the portion of the binding agent in the mixture for manufacturing the layer being approximately 0.5 to 15 volume %, in relation to the sinterable material used. After the shaping of the green product layer to form a module, this module is then fused, the binding agent and solvent being removed without residue before, or by, the thermal process. However, it is also possible to use an already-sintered layer manufactured from a sinterable material; this layer can then be fused again after being situated to form a module, or in a module.

The modules according to the present invention have great advantages in comparison with the modules known in the prior art made of polymer or ceramic materials. Thus, modules according to the present invention, manufactured from the sinterable material, have significantly higher mechanical strengths as well as better ductility, achieving up to the values for these characteristics exhibited by non-sintered metals. In this way, they can be used with versatility even in extreme temperature ranges, as well as in chemical and/or corrosive environments. If the modules according to the present invention are used as catalytic converters and/or filters, their regeneration characteristics are greatly superior to those of conventional modules made of polymer or ceramic materials. Due to these outstanding regeneration characteristics, the modules according to the present invention are exceptionally long-lived, and operate with high effectiveness.

However, the modules according to the present invention in particular avoid the problems that result during the manufacture of those known in the prior art. In wound modules, the dividing layers are separated by a spacer and are fixed only by the winding pressure and/or an anti-telescoping means (ATD or anti-telescoping device). Here the problem arises that these layers or regions of a layer must be fixed to one another and held during the manufacture of the module. Here the modules according to the present invention offer the advantage that due to the fact that the layer is manufactured from sinterable material, a holding and fixing of the individual layers of the module, or of the regions of a layer, to one another is achieved through sintering. A displacement or offset of the individual layers in a module during the operation thereof is avoided in this way, and as a result the modules according to the present invention have a higher operational reliability than do modules known in the prior art, and, in the use thereof, operating failures can thus be avoided, which finally results in a cost savings.

Finally, the modules according to the present intention also solve the problem of enabling these modules to be sealed easily and reliably through sintering. Thus, for example in spiral or wound modules, the layers used there are completely sealed on their longitudinal sides in pocket form, thus achieving a simple and outstandingly effective separation of the individual spaces present in the module, for example those for the medium flowing in and flowing out. In the modules according to the present invention, it is therefore not necessary to use additional sealing means, for example sealing rings or adhesives, whereby the lifespan and the effectiveness of the modules are increased significantly. In addition, the modules according to the present invention do not require a housing or means for fixing the individual layers among one another, because these can be formed by the layer itself. In a further specific embodiment of the present invention, however, the layer is situated in a module housing.

In a further specific embodiment of the invention, the module comprises at least one layer situated on a bearer element. This bearer element can be porous, or can be bored or can be a fabric. In this case, the bearer element can have a porosity that is greater than that of the layer in the module according to the present invention, or the porosity can be equal to or less than that of the layer in the module. However, the bearer element can also be non-porous. This element is preferably of flexible construction, for example a thin metal sheet. This advantageously makes it possible that such a layer, having a bearer element attached on one side thereof, can be used as the external layer of a module, so that no additional housing is required. The bearer element can then preferably be connected fixedly with the layer through sinteling. A further advantage of the situation of the layer on a bearer element, in particular a porous bearer element, is that in this way the mechanical strength of the individual layers in the module, and thus of the module itself, is further increased without having an adverse effect on the functioning of the module itself.

The layer is preferably self-supporting in the module. In the sense of the present invention, "self-supporting" means that the layer can be used without any bearer element without breaking or becoming fragile. It is in addition preferable that the layer be a film. In this case, it has the characteristics typical of plastic films, in particular flexibility, and, like these, can be deformed as required.

The layer is preferably fashioned in the module in the form of a pocket. Pockets of this sort are used in particular in spiral modules. Here, "in the form of a pocket" means that the layer is for example buckled in the middle and laid over itself As a result, this layer then has three open sides and one closed side. This pocket-type folding of the layer achieves a separation from the inflow current and the filtrate current in a simple manner.

Preferably, the layer shaped to form a pocket is at least partially sealed on the inside at its longitudinal sides. This sealing can take place through a thickening, for example through a simple folding over of the layer at its longitudinal sides in a range from approximately 2 to 50 mm, or through the placement of cross-strips or bordering of the edge region with a strip, or else through a thickening of the profile of the layer in the edge region thereof, produced already during the manufacture of the layer. Moreover, a narrow strip, manufactured in the same way as the layer itself, can also be applied to the edge region of this layer. This thickening advantageously enables a complete sealing of the layer shaped to form a pocket at its longitudinal sides. Unlike a sealing standard in the prior art, which is executed through gluing or with the aid of other sealing means, this sealing cannot become loose over time; rather, it remains in its originally manufactured form once it has been sintered. The sealing is achieved during the sintering of the layer through the thickening in the edge region.

In a further construction of the present invention, the layer is wound around a permeate tube, this tube being porous. The permeate tube is advantageously connected tightly to the inner side at a layer shaped to form a pocket. This porosity can for example be achieved through boring, or else in that the permeate tube itself is manufactured as a porous body from a sinterable material. This permeate tube has the task of conducting the permeate obtained from the inflowing medium out of the module as a permeate stream, said permeate having been filtered out through the thin porous layer having open porosity.

In a further form of the invention, a permeate bearer is situated in the pocket formed by the layer. This permeate bearer conducts the permeate in the pocket, obtained from the medium flowing into the module (said medium flowing over the outer side of the layer and coming into contact therewith, e.g. being filtered), to the permeate tube, and transfers it to this tube. The permeate bearer can for example be made of a wire cloth or of a perforated sheet, which during fusing preferably enters into a fixed connection with the layer manufactured from the sinterable material. Instead of the permeate bearer, the layer itself can also be profiled on its inner side. Through this profile, a hollow space is formed in the pocket, which was obtained by folding together the layer, via which space the obtained permeate is conducted to the permeate tube. The permeate bearer is narrower than the layer situated in the module, typically in a range from approximately 2 to 50 mm, preferably 3 to 15 mm. In this way, it is ensured that during the fusing and the resulting sealing of the longitudinal sides of the pocket-shaped layer, the permeate bearer does not protrude beyond the longitudinal sides thereof, which could produce a possible leakage.

Preferably, the permeate bearer is wound around the permeate tube with a circumference of approximately 0.2 to 2 times that of the permeate tube. This ensures that the permeate bearer stands in immediate contact with the permeate tube. The permeate bearer can be applied directly onto the permeate tube, or can be wound around this tube. In this way, it is advantageously achieved that the permeate bearer is pressed onto the permeate tube through the shrinkage that occurs during the sintering process. For sealing, the permeate bearer can then be sprinkled with powder that can be sintered, or can be painted with a paste of powder and binding agent. In this way, a separation of the inflowing medium from the permeate is enabled. In another specific embodiment, the permeate bearer itself can also be fashioned somewhat shorter than the layer, or else having the same length as the layer; here it must then be ensured that in the layer folded to form a pocket the two sides facing towards the open side of the pocket stand out in such a relation to one another that the side of the pocket facing away from the permeate tube protrudes past the side of the pocket facing the permeate tube. The outer and inner sides of the pocket can then be connected immediately with the permeate tube through sintering, through which a separation of the inflowing medium from the permeate is then achieved.

In a further construction of the invention, at least one spacing element is situated between the pockets, in order to separate the porous layers. This spacing element can be made of a wire cloth, which can enter into a fixed connection with the layer in particular during sintering. The spacing element has the task of creating a hollow space between the individual layers of the module, in particular the layers shaped to form a pocket, through which space the inflowing medium can enter into the module. Instead of the application of a spacing element onto the layers of the module, it is also possible to provide the outer sides of the layers themselves with a profile, so that in this way a sufficiently large hollow space is created for the medium flowing into the module.

Preferably, the layer and/or the permeate bearer and/or the separating layer and/or the permeate tube are fused. In this way, a firm fixing and binding of the individual components of the module to one another is advantageously achieved. This ensures the greatest possible lifespan and optimal sealing of the module as a whole. Additional sealing means are not required.

In a further construction of the invention, the layer is fashioned as a tube. Through the arrangement of several such layers fashioned as tubes in a module, as what is known as a tube module, a large filtering surface is obtained in a simple manner, and it is possible to do entirely without permeate bearers or separating layers. The tube elements can be manufactured through extrusion, isostatic pressing, or from plates or films. If the tubes are manufactured from plates/films, the seams of the filtered tube, formed during rolling as a longitudinal seam or as a spiral seam, are preferably connected with one another through welding; here for example what is known as tungsten-inert gas welding or electron beam welding can be used. In this way, the filter tube is made more solid, permitting a higher mechanical loading.

In addition, the invention relates to a method for manufacturing a module, in which at least one layer is fixed to a module and subsequently sintered. A green product is preferably used here as a layer. However, the manufacture of the module can also take place with sintered tube layers. A further stabilization can for example take place through a winding with metal wires or through metal strips. These can then be removed from the module after the sintering process. However, it is also possible to use for example a metal sheet for the fixing, which enters into a fixed connection with the layer during the sintering and thus simultaneously forms the module housing.

Advantageously, a pocket is formed from the layer and is wound around a permeate tube. Here, on the inner side of the layer a seal is preferably formed at least partially, in particular through a thickening, on the longitudinal sides of the layer. The thickening can here take place through the film itself, for example through folding over and double laying of a narrow strip in the edge region of the longitudinal sides thereof, or through the laying of the strip in the edge region of the longitudinal sides of the layer; here the strip can correspond to the layer itself However, it is also for example possible to lay a strip in the edge region of the longitudinal sides of the layer. Furthermore, the longitudinal side of the layer can be bordered by means of a metallic strip. Through this thickening, during fusing a fixed connection is achieved in the layer shaped to form a pocket, resulting in an excellent sealing of this layer.

A permeate bearer is preferably laid into the layer formed as a pocket, whereas a separating layer is preferably situated on the outer side of the layer. The permeate bearer and/or the separating layer and/or the permeate tube and/or the layer are preferably fused. In this way, it is possible to manufacture in a simple manner a module, for example a spiral module, in which first the individual layers, and if necessary permeate bearers and separating layers, are laid on top of one another, fixed with one another, and then fused with one another in a single sinteling process, so that these form a solid body with one another.

Finally, the invention relates to the use of a module as a filter and/or catalytic converter and/or heater.

This and additional advantages of the invention are explained on the basis of the following drawings.

DETAILED DESCRIPTION OF ILLUSTRATIVE EMBODIMENTS

Figure 1:
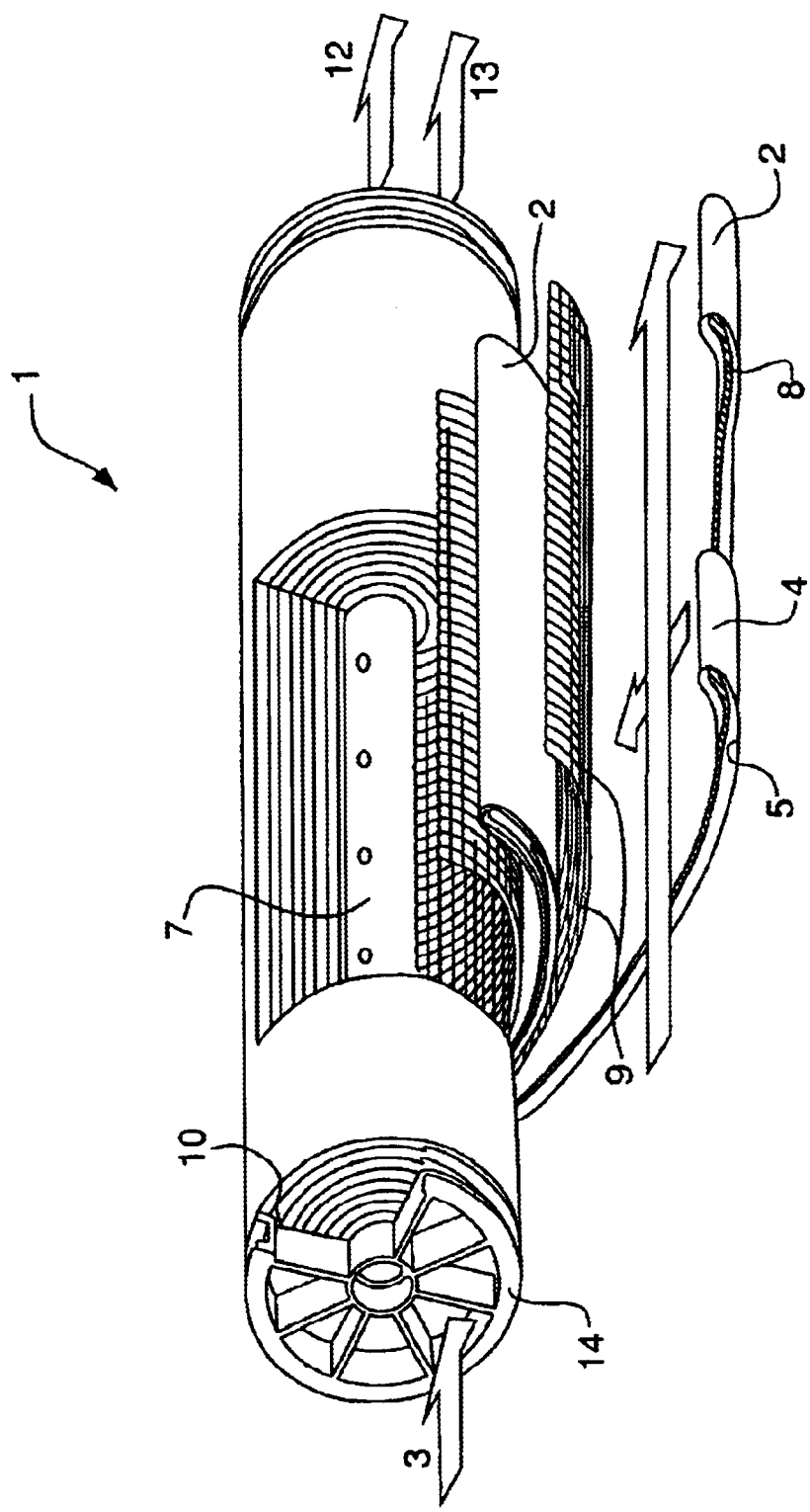
FIG. 1 shows a perspective view of a spiral module according to the present invention.

FIG. 1 shows a module designated as a whole with reference character 1, fashioned as a spiral module. In this module, a plurality of layers 2 are fashioned in the form of a pocket through folding over or laying together of a number of layers in the transverse direction. Permeate bearers 8 are laid into the pockets formed by layer 2. Permeate bearer 8, which projects on the open side of the pockets formed by layer 2, is wound around permeate tube 7. After the winding, this bearer is provided with a powder that can be sintered, which ideally corresponds to the powder from which layer 2 is manufactured. Spacing elements 9 are placed between the individual layers 2 shaped to form a pocket. Separating layers 9 and permeate bearer 8 are manufactured from a wire netting that can be fused with layer 2. On its longitudinal sides 10, layers 2 have thickened areas (not shown) on inner sides 5. These thickened areas are produced through a profiling carried out during the manufacture of layer 2 in the edge region of longitudinal sides 10 thereof.

In addition, module 1 shown in FIG. 1 has what is known as an anti-telescoping device (ATD) 14. However, this is not a necessary component of module 1. Medium 3 is now supplied to module 1 through the sections of anti-telescoping device 14. Medium 3 is guided via spacing element 9. Here medium 3 undergoes filtering. The medium penetrates from outer side 4 of layer 2 via inner side 5 thereof into the pocket, and is guided via permeate bearer 8 to permeate tube 7, from which it is then removed from module 1 as permeate 12. Residue 13, which cannot be filtered, is removed from the module via spacing element 9 on the same side of module 1 as permeate 12, but as a separate stream of medium. Filtering spiral module 1, shown in FIG. 1, has pores in a range of size of approximately 0.1 to 50 µm.

Permeate tube 7 is fixedly sealed on the side of module 1 facing inflowing medium 3, for example through the use of a corresponding stopper. The region bordering immediately on permeate tube 7, comprising permeate bearer 8 as well as the open side of layer 2 shaped to form a pocket, is sealed radially against inflowing medium 3 on the side of module 1 at which medium 3 flows in, this sealing being effected on the one hand through the thickened areas of layer 2 on longitudinal sides 10, on the other hand, after the winding of the individual layers or permeate bearers and spacing elements to form a module, it is additionally possible to apply powder that can be sintered in this region. A complete sealing then takes place through the sintering that is subsequent to the winding. The shrinkage that occurs during the sintering results in a pressure during the sintering process, which presses the edge region and the pockets having the spacers solidly together, thus producing a tight connection that can be mechanically loaded.

In the axial direction of module 1, i.e., over the length of permeate tube 7, permeate bearer 8, or layer 2 shaped to form a pocket, is sealed against inflowing medium 3 on the one hand by layer 2 itself, while on the other hand here it is also possible, through the application of powder that can be sintered, to achieve an additional axial sealing against inflowing medium 3. In this way, it is avoided that permeate 12 becomes contaminated by inflowing medium 3.

Because the fusing of the individual components of module 1 results in a fixed connection of these components to one another, it is not necessary to provide anti-telescoping device 14, as is done in standardly used modules known from the prior art made of polymer materials. This results in a savings of material costs.

Figure 2:
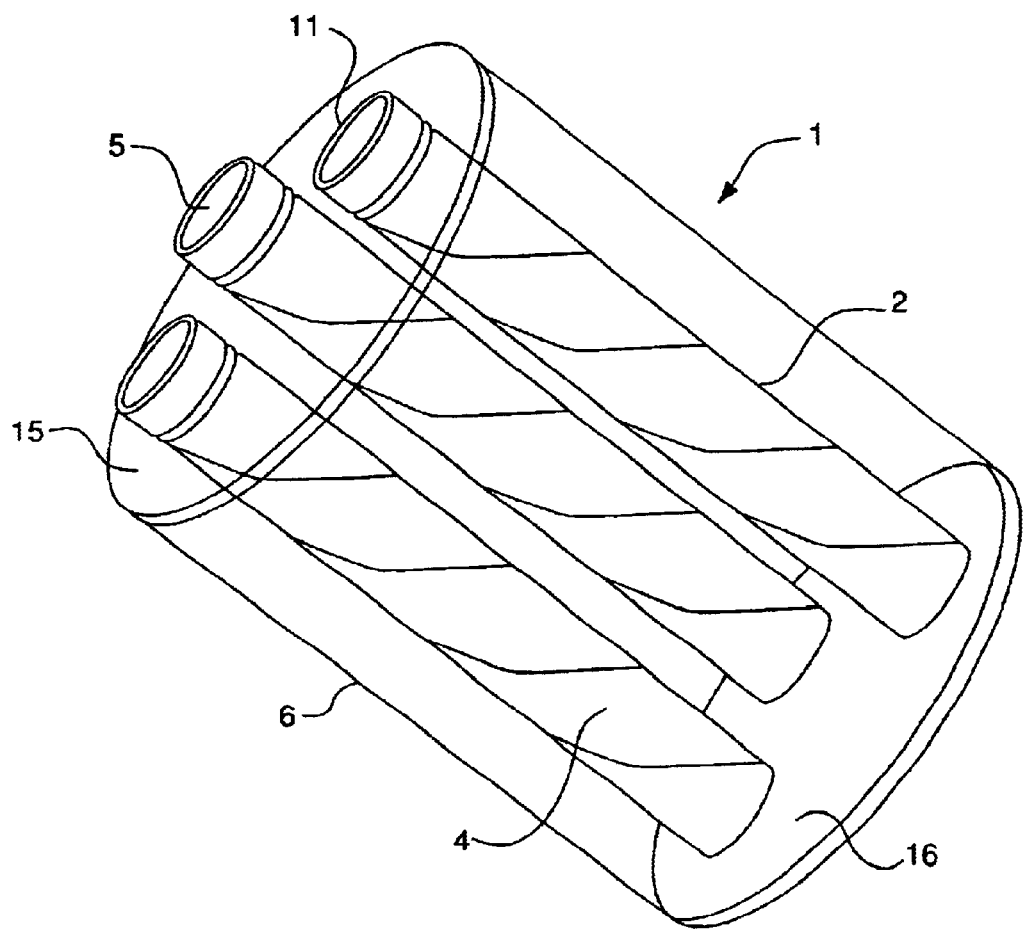
FIG. 2 shows a perspective view of a tube module according to the present invention.

FIG. 2 shows a module designated as a whole with reference character 1, fashioned as a tube module. This tube module is made up of three filter tubes 11 that were manufactured from a layer 2. The cross-seams formed thereby have been welded with one another through e.g. electron beam welding. Filter tubes 11 are situated in a housing 6. This housing 6 is provided with at least one opening. Medium 3 (not shown) can penetrate from the inside through tubes 2, or can penetrate from outside through an inlet in the jacket of housing 6, into the interior of tube module 1; the permeate obtained by means of filter tubes 11 can then be removed from vessel 6 through filter tubes 11 themselves. Filter tubes 11 are fixedly connected with vessel 6 on upper and lower side 15 or 16 thereof through fusing. Filter tubes 11 can also be filter tubes manufactured powder-metallurgically through pressing, in particular isostatic pressing, or through extrusion. In order to improve the connection of filter tubes 11 with housing 6, the region at which filter tubes 11 meet housing 6 at upper and lower sides 15 and 16 thereof can be provided before the sintering with a powder that can be sintered. Additional sealing means, in particular in the region at which filter tubes 11 meet housing 6, are not necessary.

However, the modules according to the present invention can also be fashioned as hollow-fiber modules, or as plate modules and cushion modules. The hollow fibers can in particular be manufactured through extrusion. In the plate and cushion modules, in contrast to the spiral module shown in FIG. 1, only individual layers 2 are not rolled, but rather are merely laid one over the other. Subsequently, the layer is then fused, if necessary with the separating layer and the permeate bearer, preferably made of metal wire mesh.

What is claimed:

1. A module, comprising at least one layer having open porosity, the layer having an outer side that faces a medium flowing into the module and an inner side facing away from the inflowing medium, the layer being wound around a permeate tube, the layer being manufactured from a material that can be sintered, the material being selected from a group consisting of metals, metal oxides, metal compounds, and metal alloys, the layer being formed as a pocket and longitudinal sides of the layer being sealed by sintering.

2. The module as recited in claim 1, wherein the layer is situated in a module housings.

3. The module as recited in claim 1, wherein the layer is situated on a bearer element.

4. The module recited in claim 1, wherein layer is self-supporting.

5. The module recited in claim 1, wherein the layer is a film.

6. The module as recited in claim 1, wherein the layer is thickened along a longitudinal side thereof.

7. The module as recited in claim 1, wherein an outer side of the layer is profiled.

8. The module as recited in claim 1, wherein a permeate bearer is situated in the pocket.

9. The module as recited in claim 8, wherein the permeate bearer is wound around a permeate tube so that the permeate bearer has a circumference approximately 0.2 times to approximately 2 times greater than a circumference of the permeate tube.

10. The module as recited in claim 8, wherein the permeate bearer is approximately 2 mm to approximately 50 mm narrower than the layer.

11. The module as recited in claim 1, wherein at least one spacing element is situated on an outer side of the layer.

12. The module as recited in claim 1, wherein the layer is fused to a separating layer.

13. The module as recited in claim 1, wherein the layer is fashioned as a tube.

14. The module as recited in claim 1, wherein the layer is made up of a film wrapped to form a tube, the tube having seams that are one of welded and fused.

15. The module as recited in claim 8, wherein the layer is fused to the permeate bearer.

16. The module as recited in claim 1, wherein the layer is fused to the permeate tube.

17. The module as recited in claim 1, wherein the layer is held to another of the layers by sintering.

18. The module as recited in claim 1, wherein regions of the layer are held to one another by sintering.

19. The method for manufacturing a module comprising at least one layer having open porosity, the layer having an outer side that faces a medium flowing into the module and an inner side facing away from the inflowing medium, the layer being manufactured from a material that can be sintered, the material being selected from a group consisting of metals, metal oxides, metal compounds, and metal alloys, the layer being formed as a pocket and longitudinal sides of the layer being sealed by sintering, the process comprising fixing the layer to a module housing and sintering the layer.

20. The method as recited in claim 19, wherein the layer is formed from a green product.

21. The method as recited in claim 19, further comprising wrapping the layer around a permeate tube.

22. The method as recited in claim 19, further comprising forming a thickened area at least partly on an inner side of the layer and along longitudinal sides of the layer.

23. The method as recited in claim 19, further comprising laying a permeate bearer into the layer.

24. The method as recited in claim 19, further comprising placing a separating layer on an outer side of the layer.

25. The method as recited in claim 24, further comprising fusing the layer to the separating layer.

26. The method as recited in claim 23, further comprising fusing the layer to the permeate bearer.

27. The method as recited in claim 21, further comprising fusing the layer to the permeate tube.

* * * * *

UNITED STATES PATENT AND TRADEMARK OFFICE
CERTIFICATE OF CORRECTION

| | | |
|---|---|---|
| PATENT NO. | : 6,863,706 B2 | Page 1 of 1 |
| APPLICATION NO. | : 10/371739 | |
| DATED | : March 8, 2005 | |
| INVENTOR(S) | : Thomas Röthig | |

It is certified that error appears in the above-identified patent and that said Letters Patent is hereby corrected as shown below:

Title Page,
Item (30), Foreign Application Priority Data,
Delete "100 41 992" and insert -- 100 41 992.5 --.

Column 2,
Line 9, after "…can be used" insert -- . --.
Lines 23-25, delete "100 to 500,000 g/mol, preferably 1,000 to 350,000 g/mol, or more preferably 5,000 to 6,5000 [sic] g/mol," and insert -- from 1.00 to 500.000 g/mol, preferably 1.000 to 350.000 g/mol, or more preferably 5.000 to 6.5000 g/mol, --.

Signed and Sealed this

Fifteenth Day of May, 2007

JON W. DUDAS
*Director of the United States Patent and Trademark Office*